United States Patent
Marsh et al.

(10) Patent No.: US 9,730,227 B2
(45) Date of Patent: Aug. 8, 2017

(54) DYNAMIC FREQUENCY ALLOCATION OF SATELLITE BEAMS

(71) Applicant: QUALCOMM Incorporated, San Diego, CA (US)

(72) Inventors: Gene Wesley Marsh, Encinitas, CA (US); Qiang Wu, San Diego, CA (US); Peter John Black, San Diego, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 14/864,722

(22) Filed: Sep. 24, 2015

(65) Prior Publication Data

US 2016/0277095 A1    Sep. 22, 2016

Related U.S. Application Data

(60) Provisional application No. 62/136,075, filed on Mar. 20, 2015.

(51) Int. Cl.
| | |
|---|---|
| *H04H 20/74* | (2008.01) |
| *H04W 72/04* | (2009.01) |
| *H04W 52/24* | (2009.01) |
| *H04B 7/185* | (2006.01) |
| *H04B 7/204* | (2006.01) |

(52) U.S. Cl.
CPC .......... *H04W 72/046* (2013.01); *H04B 7/185* (2013.01); *H04B 7/18513* (2013.01); *H04B 7/18539* (2013.01); *H04B 7/2041* (2013.01); *H04W 52/243* (2013.01)

(58) Field of Classification Search
CPC . H04W 74/004; H04W 74/006; H04W 88/02; H04W 52/243; H04W 72/046; H04B 7/18513; H04B 7/0408; H04B 7/2041
USPC .... 455/3.02, 3.01, 9, 12.1, 13.2, 422.1, 427, 455/428, 456.1
See application file for complete search history.

(56) References Cited

U.S. PATENT DOCUMENTS

| | | |
|---|---|---|
| 5,625,868 A | 4/1997 | Jan et al. |
| 6,011,951 A | 1/2000 | King et al. |
| 6,055,431 A | 4/2000 | Dybdal |

(Continued)

FOREIGN PATENT DOCUMENTS

| | | |
|---|---|---|
| EP | 0944183 A1 | 9/1999 |
| EP | 1223691 A2 | 7/2002 |

(Continued)

OTHER PUBLICATIONS

International Search Report and Written Opinion—PCT/US2016/021080—ISA/EPO—Jun. 15, 2016.

(Continued)

*Primary Examiner* — Shaima Q Aminzay
(74) *Attorney, Agent, or Firm* — Paradise and Lee LLP

(57) ABSTRACT

A method and apparatus for operating one or more satellites in a non-geosynchronous orbit (NGSO) satellite constellation are disclosed. In some aspects, the satellite may allocate a first frequency band to a first beam, and may allocate a second frequency band to a second beam. Then, if the first beam is disabled, the satellite may re-map the first frequency band from the first beam to the second beam. In this manner, frequency resources initially allocated to a disabled beam may be re-mapping to another, non-disabled beam.

34 Claims, 16 Drawing Sheets

(56) References Cited

U.S. PATENT DOCUMENTS

| | | |
|---|---|---|
| 6,236,834 B1 | 5/2001 | Poskett et al. |
| 6,587,687 B1 | 7/2003 | Wiedeman |
| 6,678,520 B1 | 1/2004 | Wang |
| 6,775,251 B1 | 8/2004 | Wiedeman et al. |
| 6,850,732 B2 | 2/2005 | Patterson et al. |
| 6,866,231 B2 | 3/2005 | Higgins |
| 7,554,937 B2 | 6/2009 | Lim et al. |
| 7,627,284 B2 | 12/2009 | Wang |
| 7,706,787 B2 | 4/2010 | Malarky et al. |
| 7,840,180 B2 | 11/2010 | Rosen |
| 7,995,989 B2 | 8/2011 | Wiedeman et al. |
| 8,897,769 B2 | 11/2014 | Miller et al. |
| 9,585,150 B2 | 2/2017 | Marsh et al. |
| 2001/0045494 A1 | 11/2001 | Higgins |
| 2003/0081573 A1 | 5/2003 | Anderson et al. |
| 2004/0092257 A1 | 5/2004 | Chung et al. |
| 2004/0110467 A1 | 6/2004 | Wang |
| 2007/0117509 A1 | 5/2007 | Wang |
| 2008/0242339 A1 | 10/2008 | Anderson |
| 2013/0069820 A1 | 3/2013 | Wyler |
| 2014/0177521 A1 | 6/2014 | Agarwal |
| 2015/0158602 A1 | 6/2015 | Marshack et al. |

FOREIGN PATENT DOCUMENTS

| | | |
|---|---|---|
| WO | WO-0041340 A1 | 7/2000 |
| WO | WO-02053455 A1 | 7/2002 |

OTHER PUBLICATIONS

Zhang, D. et al., "Satellite Beam Power Backoff", Co-pending U.S. Appl. No. 14/864,758, filed Sep. 24, 2015.

Marsh, G. et al., "EPFD Coverage for NGSO Satellites", Co-pending U.S. Appl. No. 14/864,791, filed Sep. 24, 2015.

ITU-R S.1503-2, "Functional description to be used in developing software tools for determining conformity of non-geostationary-satellite orbit fixed-satellite system networks with limits contained in Article 22 of the Radio Regulations", S series, Fixed Satellite service, Dec. 2013, pp. 1-115.

| Beam number | Channel number | Polarization (Circular) | Start frequency (GHz) | End frequency (GHz) | Bandwidth (MHz) |
|---|---|---|---|---|---|
| 810(1) | 1 | Right | 10.70 | 10.95 | 250 |
| 810(2) | 2 | Right | 10.95 | 11.20 | 250 |
| 810(3) | 3 | Right | 11.20 | 11.45 | 250 |
| 810(4) | 4 | Right | 11.45 | 11.70 | 250 |
| 810(5) | 5 | Right | 11.70 | 11.95 | 250 |
| 810(6) | 6 | Right | 11.95 | 12.20 | 250 |
| 810(7) | 7 | Right | 12.20 | 12.45 | 250 |
| 810(8) | 8 | Right | 12.45 | 12.70 | 250 |
| 810(9) | 9 | Left | 10.70 | 10.95 | 250 |
| 810(10) | 10 | Left | 10.95 | 11.20 | 250 |
| 810(11) | 11 | Left | 11.20 | 11.45 | 250 |
| 810(12) | 12 | Left | 11.45 | 11.70 | 250 |
| 810(13) | 13 | Left | 11.70 | 11.95 | 250 |
| 810(14) | 14 | Left | 11.95 | 12.20 | 250 |
| 810(15) | 15 | Left | 12.20 | 12.45 | 250 |
| 810(16) | 16 | Left | 12.45 | 12.70 | 250 |

803

*FIG. 8D*

DYNAMIC FREQUENCY ALLOCATION OF SATELLITE BEAMS

CROSS-REFERENCE TO RELATED APPLICATIONS

This application claims priority under 35 USC 119(e) and commonly owned U.S. Provisional Patent Application No. 62/136,075 entitled "IMPROVING EPFD COVERAGE FOR NGSO SATELLITES" filed on Mar. 20, 2015, the entirety of which is incorporated by reference herein.

INTRODUCTION

Various aspects described herein relate to satellite communications, and more particularly to complying with international regulations governing satellite communications.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits (NGSO), such as low-earth orbits (LEO), have been devised to provide communication coverage to the entire Earth or at least large parts of the Earth.

GSO and NGSO satellites may operate on the same (or similar) frequency bands, and therefore interference mitigation techniques may be employed by NGSO satellites so that GSO satellite communications are not impaired by NGSO satellite transmissions. For example, the International Telecommunication Union (ITU) provides limits on the equivalent power flux-density (EPFD) that an NGSO satellite may produce at any point on the Earth's surface lying within the footprint of a GSO satellite.

Because calculating the EPFD at a given point on the Earth's surface may require extensive knowledge of the antenna and/or transmissions characteristics of various ground stations, NGSO satellites typically use other techniques to meet the ITU's EPFD limits. One method of meeting the EPFD limits is for an NGSO satellite to disable its beam if, at any point in the beam's coverage area on Earth, the angle between the NGSO satellite and the GSO satellite is less than a threshold angle (e.g., which may indicate that the GSO satellite's beam termination point on Earth lies within the coverage area of the NGSO satellite's beam). Although disabling the beam of an NGSO satellite in this manner may allow the NGSO satellite to meet the EPFD limits, this may result in unnecessary coverage gaps for the NGSO satellite communication system (e.g., when only a portion of the NGSO satellite's beam interferes with the GSO satellite's transmissions). Further, when the beam is disabled, resources associated with the disabled beam may be idled, which in turn may reduce the overall capacity of the NGSO satellite.

SUMMARY

Aspects of the disclosure are directed to apparatuses and methods for re-allocating resources associated with a satellite beam that has been (or it to be) disabled, for example, to comply with the ITU's EPFD limits and/or to avoid interfering with GSO satellite communications. In one example, a method of operating a satellite is disclosed. The method may include allocating a first frequency band to a first beam of the satellite, and allocating a second frequency band to a second beam of the satellite. The method may also include disabling the first beam, and re-mapping the first frequency band from the first beam to the second beam.

In another example, an apparatus for operating a satellite is disclosed. The apparatus may include means for allocating a first frequency band to a first beam of the satellite, means for allocating a second frequency band to a second beam of the satellite, means for disabling the first beam, and means for re-mapping the first frequency band from the first beam to the second beam.

In another example, an apparatus for operating a satellite is disclosed. The apparatus may include one or more processors and a memory configured to store instructions. Execution of the instructions by the one or more processors may cause the apparatus to allocate a first frequency band to a first beam of the satellite, allocate a second frequency band to a second beam of the satellite, disable the first beam, and re-map the first frequency band from the first beam to the second beam.

In another example, a non-transitory computer-readable medium is disclosed. The non-transitory computer-readable medium may store instructions that, when executed by one or more processors of a satellite, cause the satellite to perform operations that may include allocating a first frequency band to a first beam of the satellite, allocating a second frequency band to a second beam of the satellite, disabling the first beam, and re-mapping the first frequency band from the first beam to the second beam.

BRIEF DESCRIPTION OF THE DRAWINGS

Aspects of this disclosure are illustrated by way of example and are not intended to be limited by the figures of the accompanying drawings.

FIG. 8D is table summarizing example frequency bands and polarizations allocated to the number of beams shown in FIG. 8A.

Like reference numerals refer to corresponding parts throughout the drawing figures.

DETAILED DESCRIPTION

Figure 1:
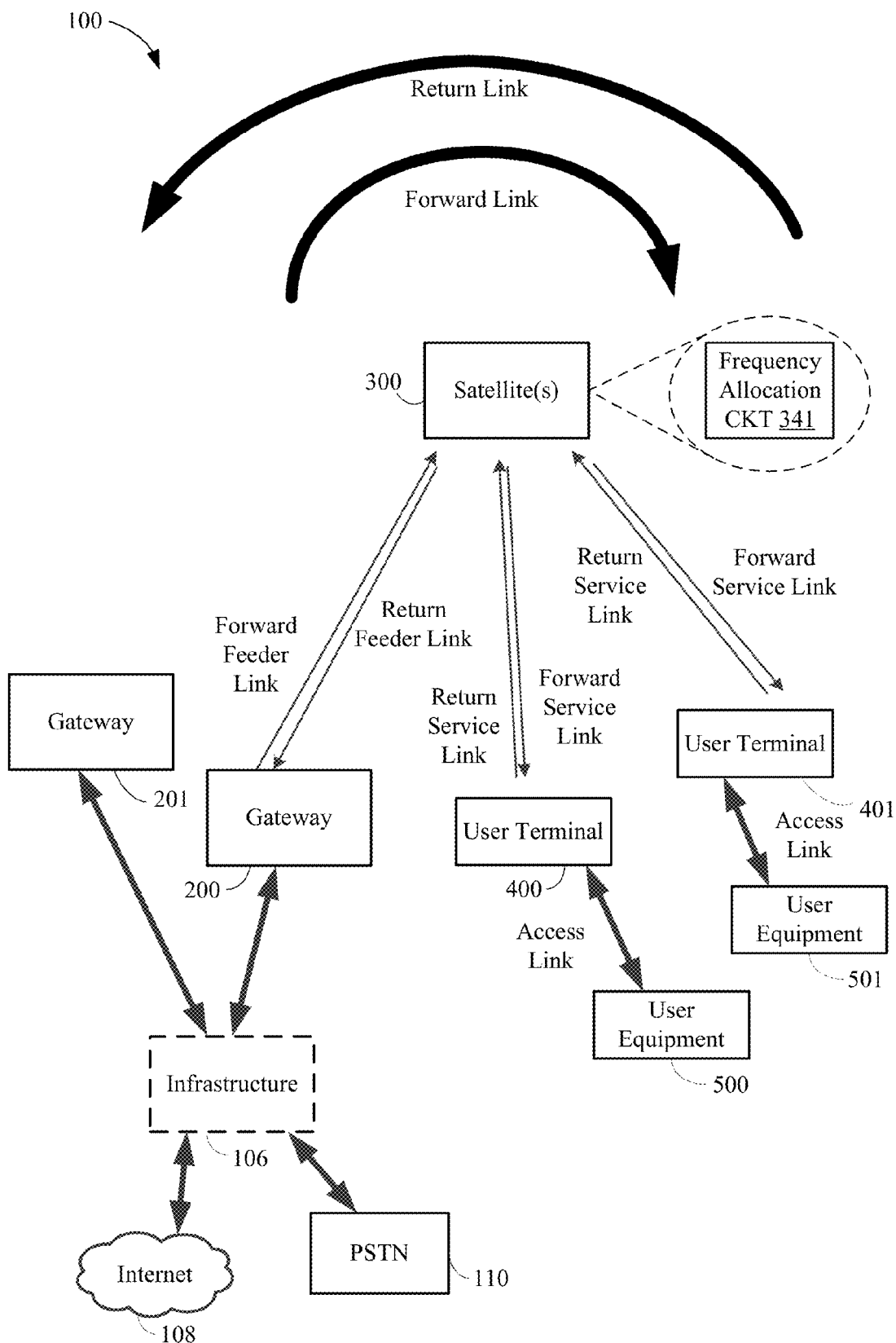
FIG. 1 shows a block diagram of an example communication system.

The example implementations described herein may allow each satellite in an NGSO satellite constellation to re-allocate resources associated with a disabled beam to another, non-disabled beam. As described in more detail below, a number of beams may be transmitted from each of the satellites in the NGSO satellite constellation. Each satellite may allocate a number of different frequency bands to the one or more beams. Thereafter, if a first beam is disabled (e.g., to comply with EPFD limits), then the satellite may re-map the frequency associated with the first beam to a second beam that is not disabled. In this manner, frequency resources initially allocated to a disabled beam may be re-mapped to another, non-disabled beam.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations, the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

In some implementations, the satellite 300 may include a frequency allocation circuit 341 that may be used to re-allocate frequency bands from one or more beams to be disabled (e.g., to comply with EPFD limits) to one or more beams that are not to be disabled. As explained in more detail below, the ability to re-map, re-assign, or otherwise re-allocate frequency bands associated with one or more disabled beams to one or more non-disabled beams may improve the bandwidth (e.g., data transmission capacity) of the one or more non-disabled beams, for example, compared with satellites that do not re-map frequency bands associated with disabled beams. The frequency allocation circuit 341 may be implemented in any suitable manner and/or may include any suitable devices or components including, for example, CPUs, ASICs, DSPs, FPGAs, and the like. For at least some example implementations, the frequency allocation circuit 341 may be implemented (or the functions of frequency allocation circuit 341 may be performed) by execution of one or more programs containing instructions by any suitable one or more processors. The instructions may be stored in a non-transitory computer-readable medium.

For other implementations, the frequency allocation circuit 341 may be included within, connected to, or otherwise associated with gateway 200. For such implementations, the frequency allocation circuit 341 may transmit, to one or more corresponding satellites 300, a number of control signals and/or instructions that may cause each of the corresponding satellites 300 to re-map frequency bands from one or more beams to be disabled to one or more beams that are not to be disabled.

Figure 2:
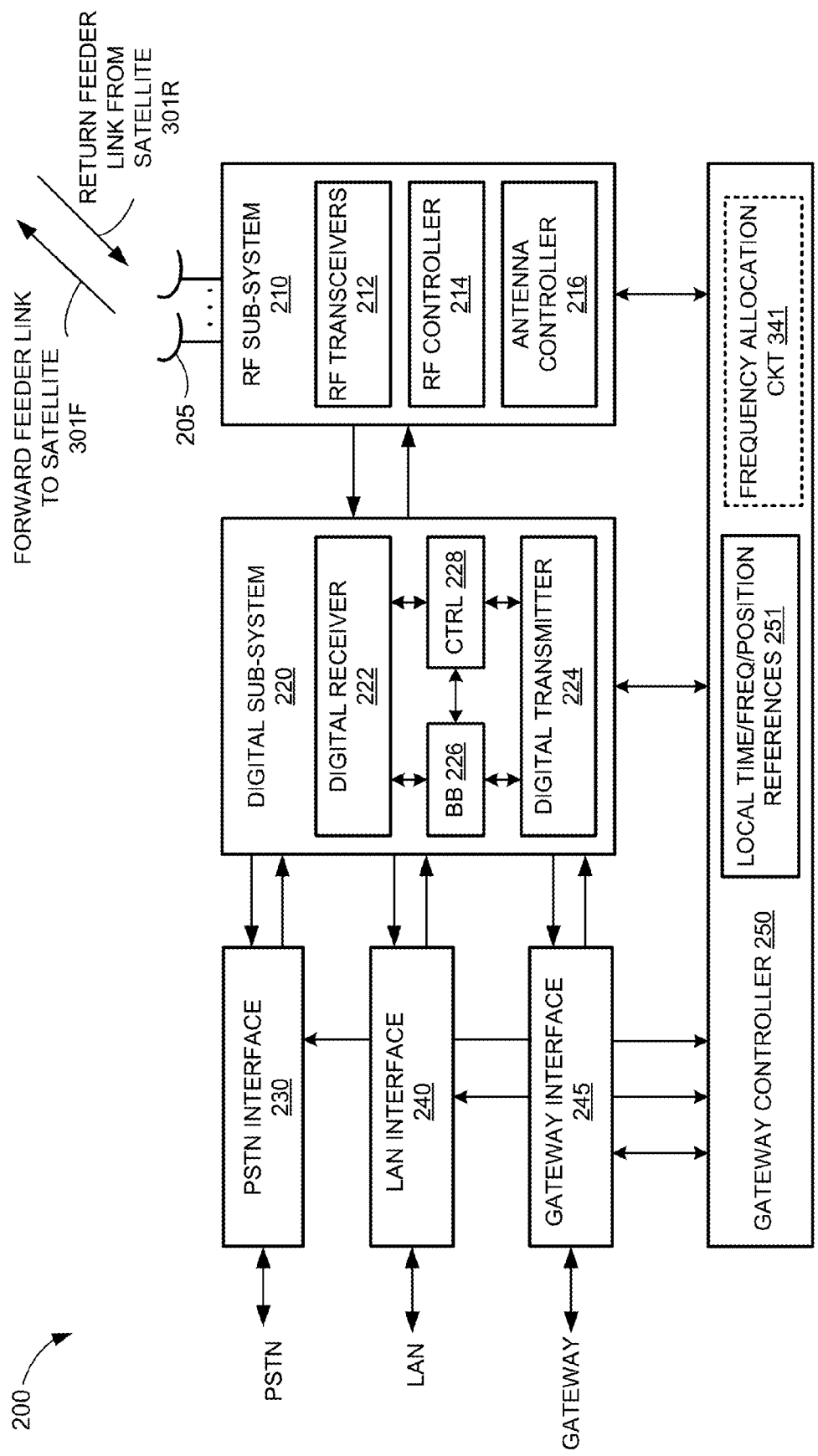
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

As mentioned above, in some implementations, the gateway 200 may include a frequency allocation circuit 341 to re-map frequency bands from one or more beams of satellite 300 to be disabled to one or more beams of satellite 300 that are not to be disabled. More specifically, for such implementations, the frequency allocation circuit 341 may generate a number of control signals and/or instructions that, when transmitted to a number of satellites 300, may cause each of the satellites 300 to re-map frequency bands from one or more disabled beams to one or more non-disabled beams. The frequency allocation circuit 341 may be provided within the gateway controller 250, as depicted in the example of FIG. 2, or may be connected to or otherwise associated with gateway 200.

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions. For at least some implementations, the NCC and/or the SCC may include one or more frequency allocation circuits 341 to generate control signals and/or instructions to re-map frequency bands associated with one or more disabled beams to one or more non-disabled beams. The NCC and/or the SCC may transmit the control signals and/or instructions to the satellites 300 via one or more gateways such as gateway 200. In some aspects, the one or more frequency allocation circuits 341 may reside within the NCC and/or the SCC, and gateway 200 may not include the frequency allocation circuit 341.

Figure 3:
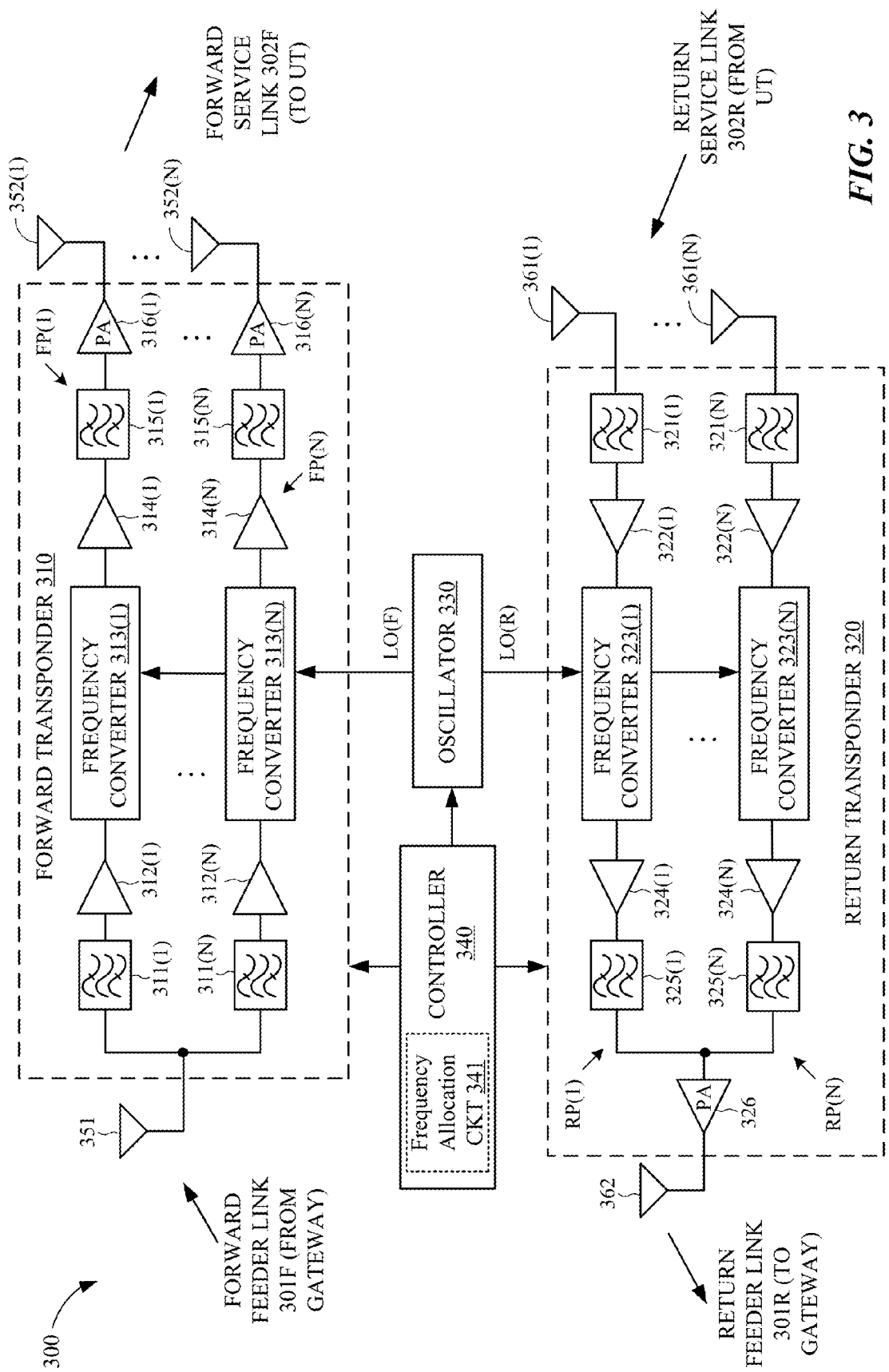
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various operations of satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein with respect to FIGS. 10 and 11.

As mentioned above, in some implementations, the satellite 300 may include a frequency allocation circuit 341 that may be used to re-map, re-assign, or otherwise re-allocate frequency bands from one or more disabled beams to one or more non-disabled beams. The frequency allocation circuit 341 may be implemented in any suitable manner and/or may include any suitable devices or components including, for example, CPUs, ASICs, DSPs, FPGAs, and the like. For at least some example implementations, the frequency allocation circuit 341 may be implemented (or the functions of frequency allocation circuit 341 may be performed) by execution of one or more programs containing instructions by any suitable one or more processors. The instructions may be stored in a non-transitory computer-readable medium. For other implementations, the frequency allocation circuit 341 may be provided within, connected to, or otherwise associated with gateway 200 and/or with a corresponding NCC or SCC as described above with respect to FIG. 2. For such implementations, the frequency allocation circuit 341 may transmit, to one or more corresponding satellites 300, a number of control signals and/or instructions that may cause each of the corresponding satellites 300 to re-map frequency bands from one or more beams to be disabled to one or more beams that are not to be disabled.

Figure 4:
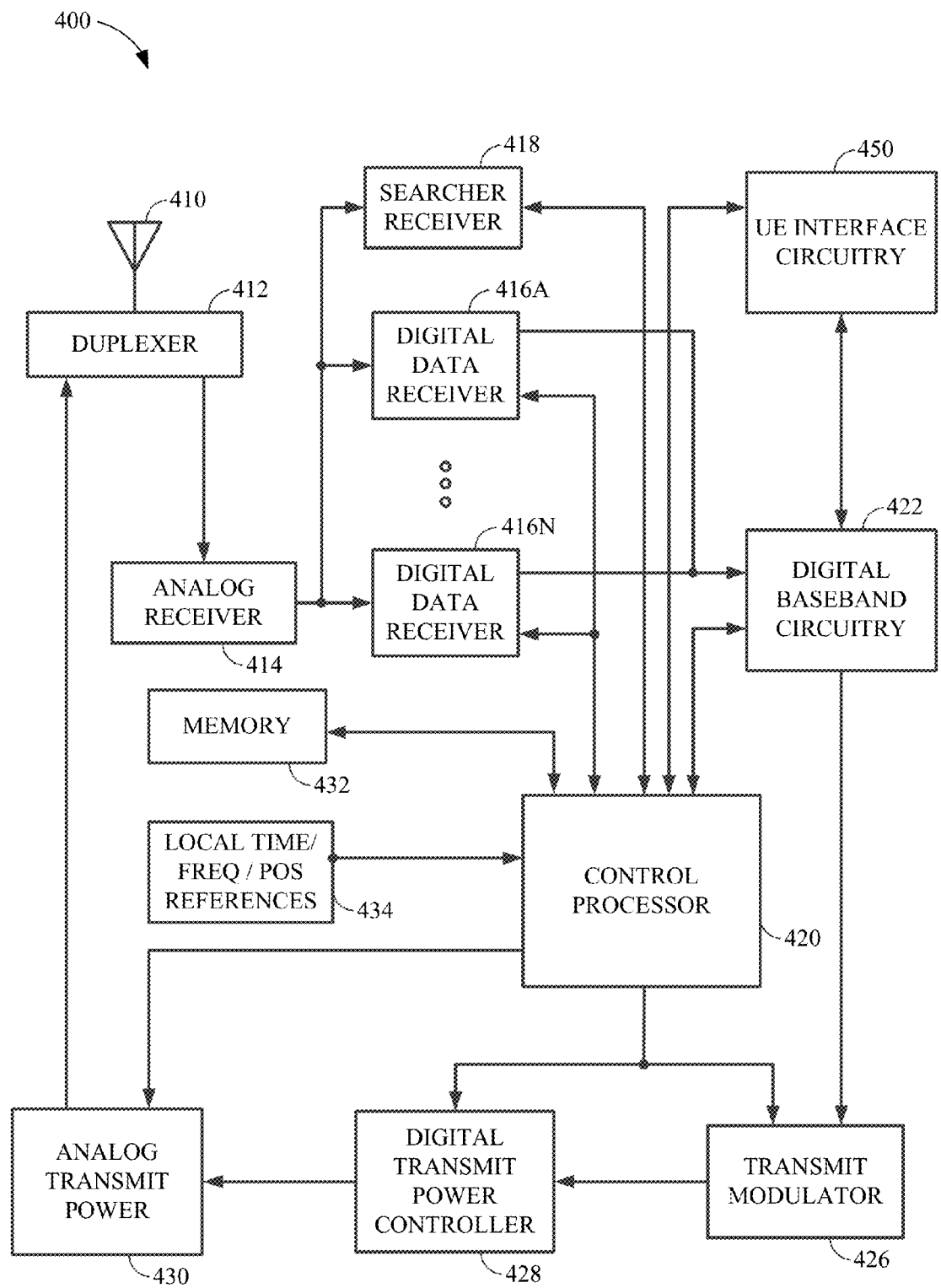
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with UT 400.

Figure 5:
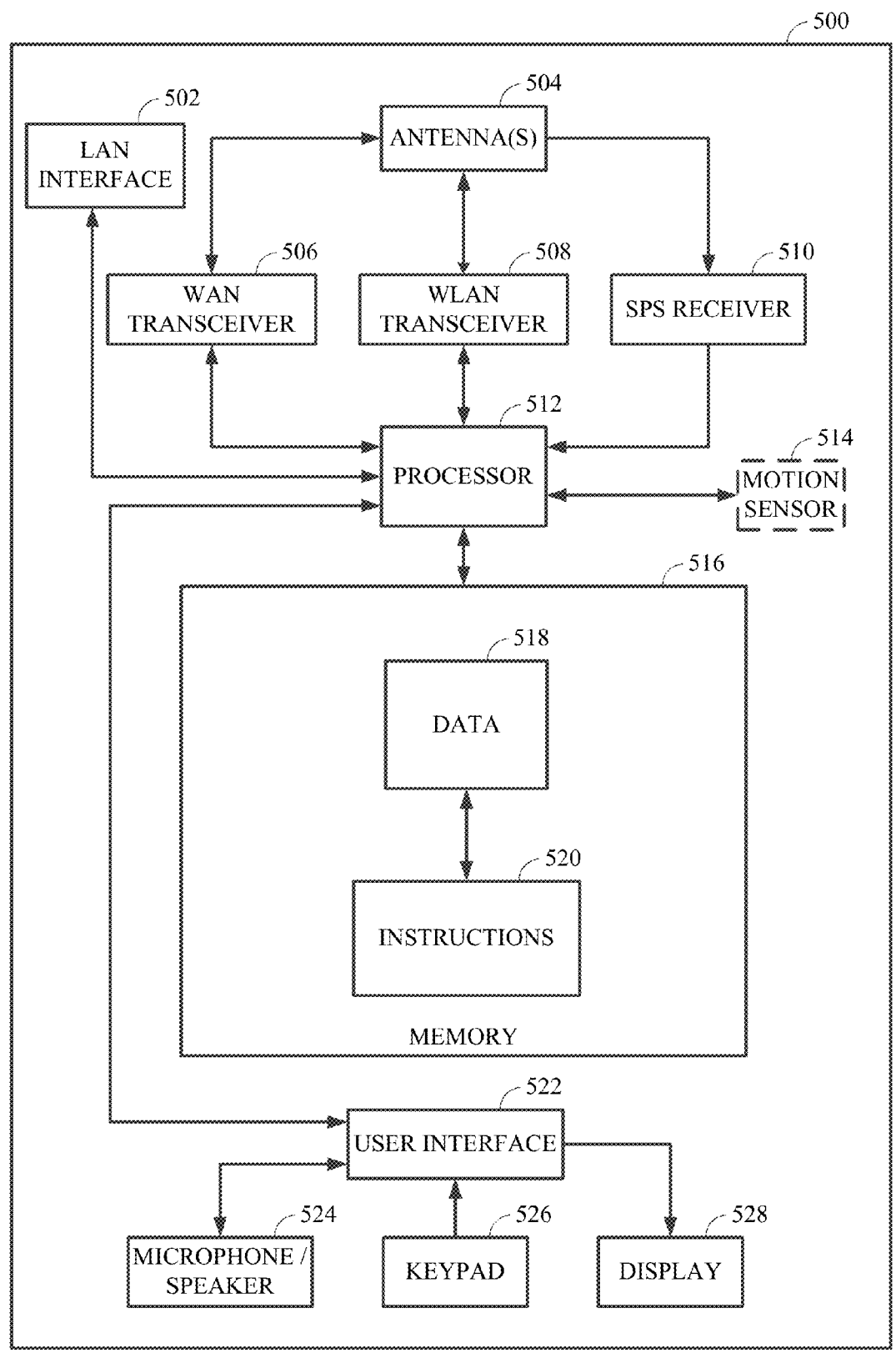
FIG. 5 shows a block diagram of one example of the user equipment (UE) of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

As mentioned above, GSO satellites are deployed in geostationary orbits at approximately 35,000 km above the Earth's surface, and revolve around the Earth in an equatorial orbit at the Earth's own angular velocity. In contrast, NGSO satellites are deployed in non-geostationary orbits and revolve around the Earth above various paths of the Earth's surface at relatively low altitudes (e.g., as compared with GSO satellites).

Figure 6:
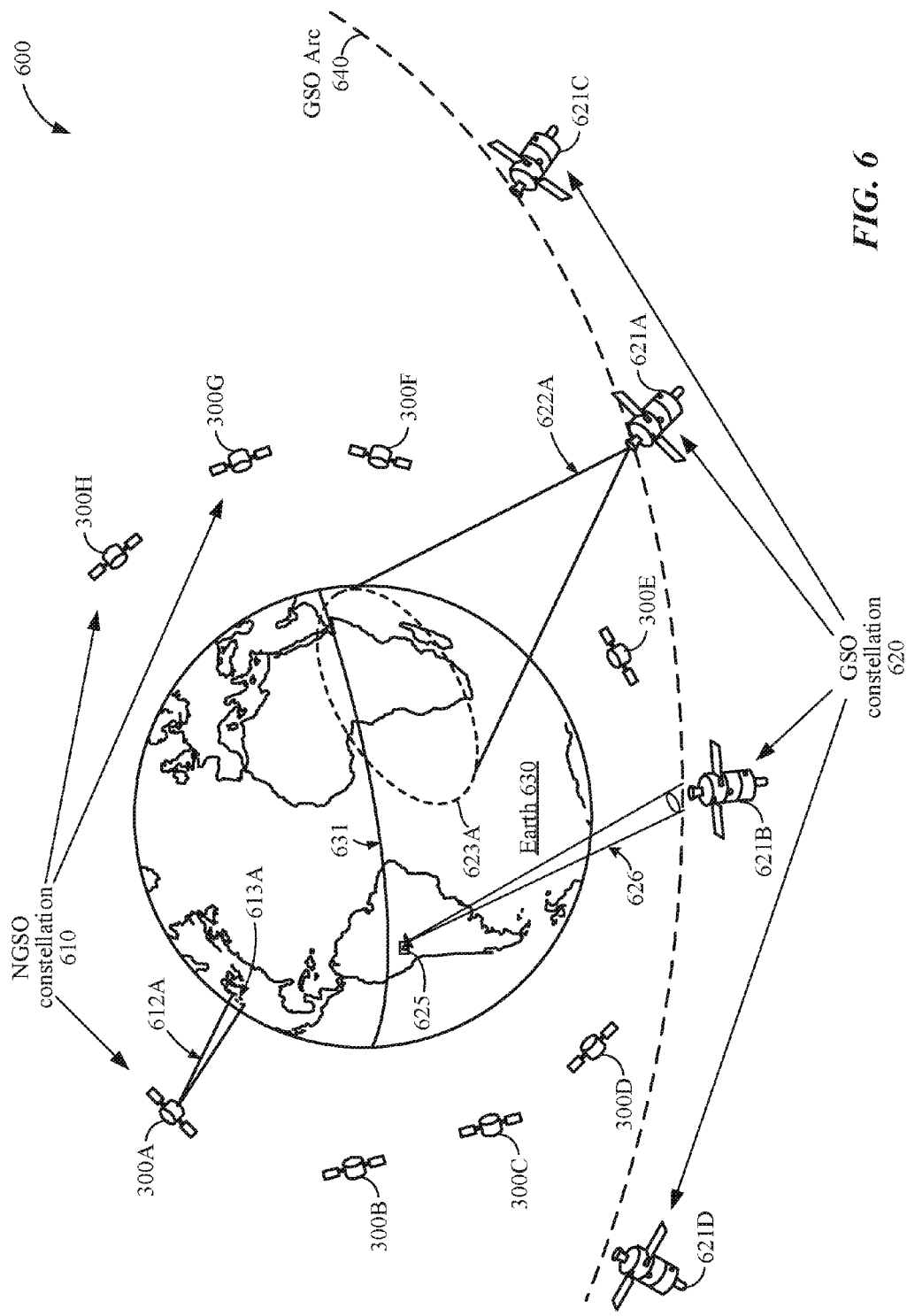
FIG. 6 shows a diagram depicting an NGSO satellite constellation and a GSO satellite constellation orbiting the Earth.

For example, FIG. 6 shows a diagram 600 depicting a first constellation 610 of NGSO satellites 300A-300H and a second constellation 620 of GSO satellites 621A-621D in orbit around Earth 630. Although depicted in FIG. 6 as including only eight NGSO satellites 300A-300H, the first constellation 610 may include any suitable number of NGSO satellites, for example, to provide world-wide satellite coverage. For some implementations, the first constellation 610 may include between 600 and 900 NGSO satellites. Similarly, although depicted in FIG. 6 as including only four GSO satellites 621A-621D, the second constellation 620 may include any suitable number of GSO satellites, for example, to provide world-wide satellite coverage. In addition, although not shown in FIG. 6 for simplicity, one or more other constellations of GSO satellites and/or one or more other constellations of NGSO satellites may be in orbit above Earth 630.

The first constellation 610, which may hereinafter be referred to as the NGSO satellite constellation 610, may provide a first satellite service to most, if not all, areas on Earth 630. The second constellation 620, which may hereinafter be referred to as the GSO satellite constellation 620, may provide a second satellite service to large portions of Earth 630. The first satellite service may be different than the second satellite service. For some aspects, the first satellite service provided by the NGSO satellite constellation 610 may correspond to a global broadband Internet service, and the second satellite service provided by the GSO satellite constellation 620 may correspond to a satellite-based broadcast (e.g., television) service. Further, for at least some implementations, each of NGSO satellites 300A-300H may be one example of satellite 300 of FIGS. 1 and 3.

The NGSO satellites 300A-300H may orbit the Earth 630 in any suitable number of non-geosynchronous orbital planes (not shown for simplicity), and each of the orbital planes may include a plurality of NGSO satellites (e.g., such as one or more of the NGSO satellites 300A-300H). The non-geosynchronous orbital planes may include, for example, polar orbital patterns and/or Walker orbital patterns. Thus, to a stationary observer on Earth 630, the NGSO satellites 300A-300H appear to move quickly across the sky in a plurality of different paths across the Earth's surface, with each of the NGSO satellites 300A-300H providing coverage for a corresponding path across the earth's surface.

In contrast, the GSO satellites 621A-621D may be in a geosynchronous orbit around Earth 630 and thus, to a stationary observer on Earth 630, may appear motionless in a fixed position in the sky located above the Earth's equator 631. Each of the GSO satellites 621A-621D maintains a relatively fixed line-of-sight with a corresponding GSO ground station on Earth 630. For example, GSO satellite 621B is depicted in FIG. 6 as maintaining a relatively fixed line-of-sight with a GSO ground station 625. It is noted that for a given point on the surface of Earth 630, there may be an arc of positions in the sky along which the GSO satellites 621A-621D may be located. This arc of GSO satellite positions may be referred to herein as the GSO arc 640. The receiving area for a GSO ground station (e.g., such as GSO ground station 625) may be defined by an antenna pattern of typically fixed orientation and fixed beam width (such as a beam width defined by an ITU specification). For example, the GSO ground station 625 is depicted as directing a beam 626 towards GSO satellite 621B.

In some aspects, each of the NGSO satellites 300A-300H may include a number of directional antennas to provide high-speed forward links (e.g., downlinks) with user terminals such as UT 400 of FIG. 1 and/or with gateways such as gateway 200 of FIG. 1. A high-gain directional antenna achieves higher data rates and is less susceptible to interference than an omni-directional antenna by focusing radiation into a relatively narrow beam width (as compared to the relatively wide beam width associated with an omni-directional antenna). For example, as depicted in FIG. 6, the coverage area 613A provided by a beam 612A transmitted from NGSO satellite 300A may be relatively small compared to the coverage area 623A provided by a beam 622A transmitted from GSO satellite 621A. Accordingly, although not shown in FIG. 6 for simplicity, the footprint of each of NGSO satellites 300A-300H may be significantly smaller than the footprint of each of GSO satellites 621A-621D.

Because the NGSO satellites 300A-300H may communicate with ground-based gateways (not shown in FIG. 6 for simplicity) using at least part of the same frequency spectrum used by GSO satellites 621A-621D, the NGSO satellites 300A-300H are not to exceed the EPFD limits established by the ITU. A given NGSO satellite most likely risks exceeding the EPFD limits and potentially interfering with GSO satellite communications if transmissions from both the given NGSO satellite and the GSO satellite are received at a point on the Earth's surface within the receiving area of a GSO ground station, for example, as defined by the GSO ground station's beam pattern (e.g., antenna pattern). For the example of FIG. 6, the beam pattern 626 of GSO ground station 625 may be defined by a line from the GSO ground station 625 to the GSO satellite 621B and an associated angular beam width. NGSO satellites 300A-300H may determine whether their transmissions are likely to exceed the EPFD limits and/or interfere with GSO satellite communications by comparing angles between the GSO arc, the GSO ground station, and the NGSO satellite, and then determining if the angles fall within the GSO ground station's beam pattern. Because of the relatively large footprints of the GSO satellites 621A-621D and the relatively large number of satellites in the NGSO satellite constellation 610, complying with the EPFD limits established by the ITU is, although challenging, important to the operation of the NGSO satellite constellation 610.

Figure 7A:
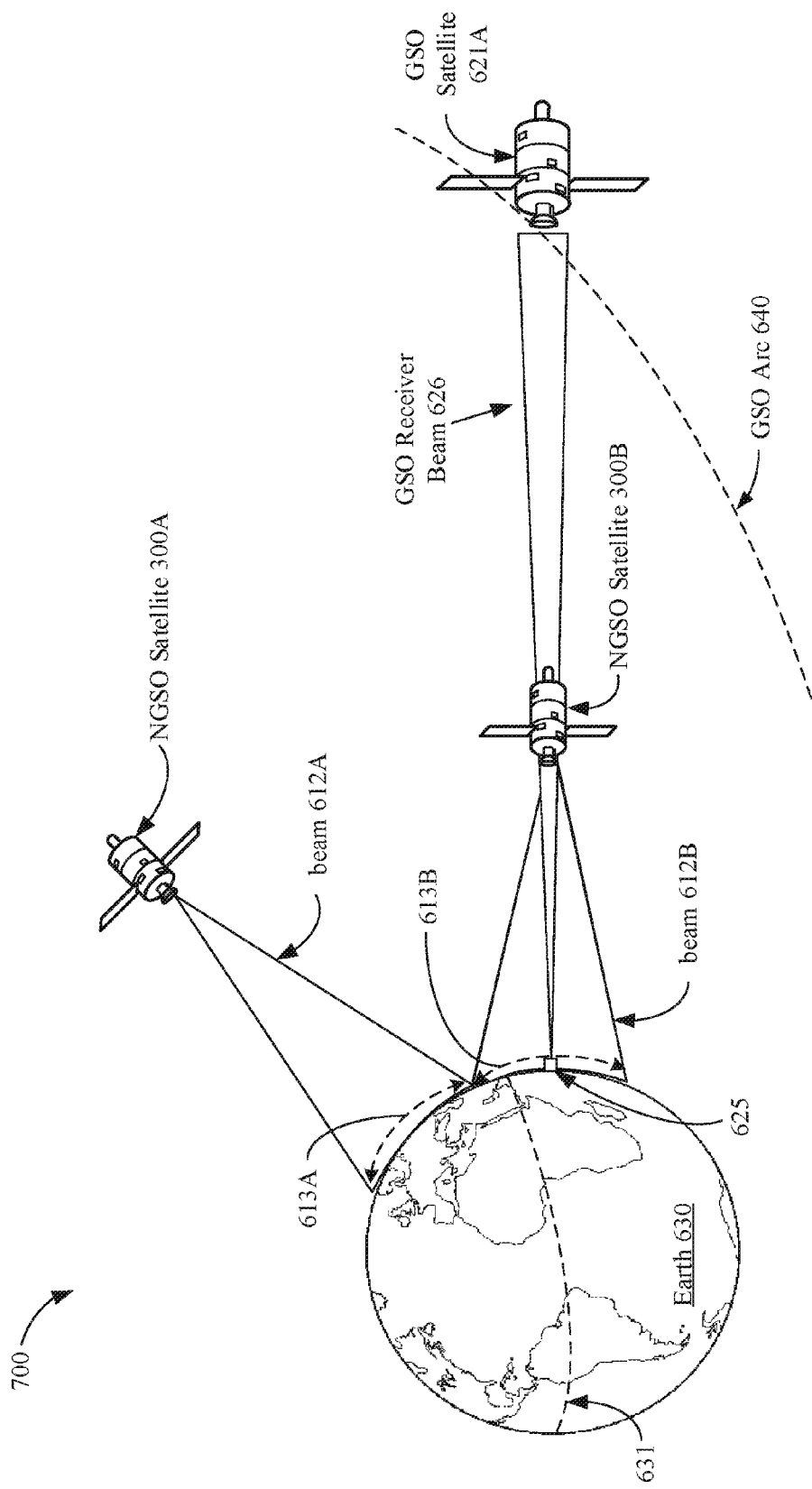
FIG. 7A depicts example positions of two NGSO satellites with respect to a GSO satellite and the Earth.

Referring also to the example depiction 700 of FIG. 7A, a first NGSO satellite 300A is depicted as directing beam 612A towards a first coverage area 613A on the Earth's surface, and a second NGSO satellite 300B is depicted as directing beam 612B towards a second coverage area 613B on the Earth's surface. For actual implementations, the NGSO satellites 300A and/or 300B may each transmit any number of beams, and one or more of the beams may be directed towards overlapping regions on the Earth's surface. As used herein, the footprint of a satellite is the surface area (on Earth) within which all UTs can communicate with the satellite (above a minimum elevation angle). The area covered by a beam transmitted (e.g., from a corresponding antenna) of the satellite is referred to herein as the beam coverage area. Thus, the footprint of a satellite may be defined by a number of beam coverage areas provided by a number of beams transmitted from the satellite.

More specifically, for the example of FIG. 7A, considering the second NGSO satellite 300B, the second NGSO satellite 300B may determine, for each point within the coverage areas of its beams on the Earth's surface (as an example, the coverage area 613B of the beam 612B), an angle between a first line extending from the point on Earth to the second NGSO satellite 300B and each of a plurality of second lines extending from the point on Earth to positions along the GSO arc 640 (e.g., the positions along the GSO arc 640 corresponding to possible locations of GSO satellites). For simplicity, the first and second lines are not shown in FIG. 7A. The determined angles may be referred to herein as the "arc angles ($\alpha$)." Then, for the point on Earth, a minimum of the arc angles may be determined. This process may be repeated for all points within the coverage areas of the beams of second NGSO satellite 300B. Then, if the minimum arc angles are less than a threshold angle (e.g., 2°) for any point on Earth 630 within the beam coverage areas, the second NGSO satellite 300B may disable its interfering beams to avoid potential interference with GSO satellite communications.

Figure 7B:
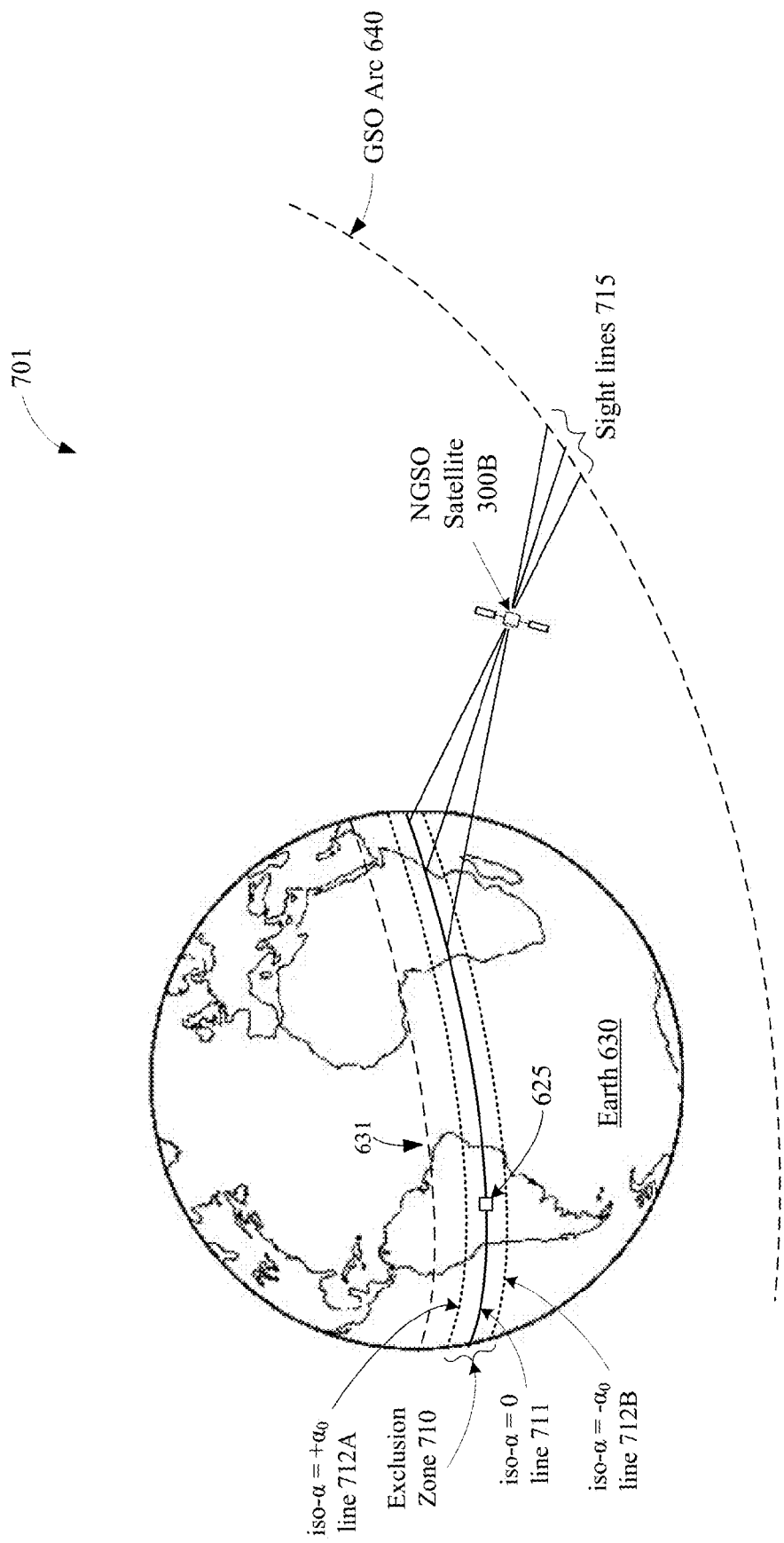
FIG. 7B depicts an example exclusion zone that may be defined in accordance with the ITU's guidelines on EPFD limits.

The determined arc angles may correspond to an exclusion zone defined in accordance with the ITU's guidelines on EPFD limits for NGSO satellites. For example, FIG. 7B shows a diagram 701 depicting an example exclusion zone 710 that may be defined, in accordance with the ITU's guidelines on EPFD limits, for the example GSO ground station 625. From the field of view of the second NGSO satellite 300B, three iso-$\alpha$ lines 711 and 712A-712B may be "drawn" on the surface of Earth 630. Each of the iso-$\alpha$ lines 711 and 712A-712B may represent points on the surface of Earth 630 that share the same value of the arc angle $\alpha$. More specifically, a first iso-$\alpha$ line 711 may represent points on the surface of Earth 630 for which $\alpha=0$. The first iso-$\alpha$ line 711 may be defined by a plurality of sight lines 715 extending from points on the GSO arc 640 through NGSO satellite 300B to points on Earth 630. The points on Earth corresponding to sight lines 715 may then be used to define the first iso-a line 711 (e.g., for which the value of $\alpha=\alpha_0$). A second iso-$\alpha$ line 712A may represent points on the surface of Earth 630 for which $\alpha=+\alpha_0$, and a third iso-a line 712B may represent points on the surface of Earth 630 for which $\alpha=-\alpha_0$. The value of $\alpha_0$, which may be the threshold angle described above with respect to FIG. 7A, may correspond to a specified EPFD limit. In some aspects, the specified EPFD limit may be approximately $-160$ dB (W/m$^2$) within a specified bandwidth (e.g., within a bandwidth corresponding to at least part of the frequency spectrum used by GSO satellites). The exclusion zone 710 may then be defined as the surface area on Earth 630 lying between the "boundary" iso-$\alpha$ lines 712A-712B. Accordingly, points on Earth 630 that lie within the exclusion zone 710 may experience an EPFD value equal to or greater than the specified EPFD limit (e.g., equal to or greater than $-160$ dB).

Per the ITU's guidelines on EPFD limits for NGSO satellites, the second NGSO satellite 300B is to disable any of its beams when one or more points on Earth see the second NGSO satellite 300B within the threshold angle $\alpha_0$ of the GSO arc 640 (e.g., for points lying within the exclusion zone 710). In other words, according to at least one conventional interference mitigation technique to comply with the ITU's EPFD limits on NGSO satellite transmissions, if the $-160$ dB PH) contour of a beam transmitted from second NGSO satellite 300B overlaps the exclusion zone 710, then the second NGSO satellite 300B is to turn off the beam. As used herein, a beam's PFD contour may indicate a portion of the beam's coverage area on Earth for which the beam's PFD is greater than or equal to a specified EPFD limit Thus, for example, a beam's $-160$ dB PFD contour may refer to the coverage area on Earth for which the beam's PFD is greater than or equal to $-160$ dB.

However, disabling the beams of second NGSO satellite 300B in the manner described above with respect to FIGS. 7A-7B does not take into account other factors that, if considered, may indicate that the beams of second NGSO satellite 300B do not exceed the EPFD limits and/or may not actually interfere with GSO satellite communications. For the example of FIG. 7A, specifically considering the beam 612B transmitted from second NGSO satellite 300B, the receiver beam 626 associated with GSO satellite 621A terminates within the coverage area 613B of the beam 612B, and therefore the minimum arc angles for all points on Earth 630 within the beam coverage area 613B may be close to zero. Thus, using conventional approaches to comply with the EPFD limits, the second NGSO satellite 300B would disable beam 612B until the minimum arc angles for all points on Earth 630 within the beam coverage area 613B exceed the threshold angle (e.g., due to movement of the beam coverage area 613B across the Earth's surface resulting from positional changes of the second NGSO satellite 300B along its orbit).

However, if the transmit power of the beam 612B from the second NGSO satellite 300B is below a threshold level, then the beam 612B may not interfere with the GSO satellite 621A's communications even when all of the determined arc angles are less than the threshold angle. Because disabling beam 612B may create a gap in the coverage area on Earth 630 provided by the NGSO satellite constellation 610, it is desirable for the second NGSO satellite 300B to disable beam 612B only when it actually interferes with GSO satellite communications and/or when the EPFD limits are actually exceeded (e.g., rather than automatically disabling an NGSO satellite beam when the beam's PFD contour touches the exclusion zone).

In accordance with example implementations, an NGSO satellite may consider its transmission characteristics when determining whether to disable one or more of its beams. More specifically, for each of the beams transmitted from the NGSO satellite, the beam's transmission characteristics may be used to determine (1) a first region of the beam's coverage area that may potentially interfere with GSO satellite transmissions and (2) a second region of the beam's coverage area that does not interfere with GSO satellite transmissions. Then, for each point in the first region, the minimum arc angle between the NGSO satellite and the GSO arc may be determined. If the determined minimum arc angle is less than a threshold angle for any point in the first region of the beam's coverage area, then the NGSO satellite may disable the beam. However, in contrast to conventional approaches, minimum arc angles for the second region of the beam's coverage area may not be determined, for example, because the second region of the beam's coverage area may be defined as not interfering with GSO satellite transmissions. Accordingly, in accordance with some aspects of the present disclosure, the NGSO satellite may disable the beam for which the minimum arc angle is less than the threshold angle, as measured relative to points in the first region, without considering minimum arc angles measured relative to points in the second region.

Further, for at least some implementations, when an NGSO satellite disables one of its beams, the NGSO satellite may re-allocate resources associated with the disabled beam to another beam transmitted from the NGSO satellite. In some aspects, when the NGSO satellite disables a beam, for example, to meet EPFD limits, the NGSO satellite may re-map a frequency band associated with the disabled beam to another (e.g., non-disabled) beam transmitted from the NGSO satellite. As explained in more detail below, the ability to re-map frequency bands of one or more disabled beams to one or more non-disabled beams may maximize frequency re-use plans of the NGSO satellite, which in turn may maximize the throughput (e.g., capacity) of the NGSO satellite. Further, when frequency re-mapping techniques of the example implementations are employed by a plurality of NGSO satellites in an NGSO satellite constellation, overall system throughput may be maximized.

Figure 8A:
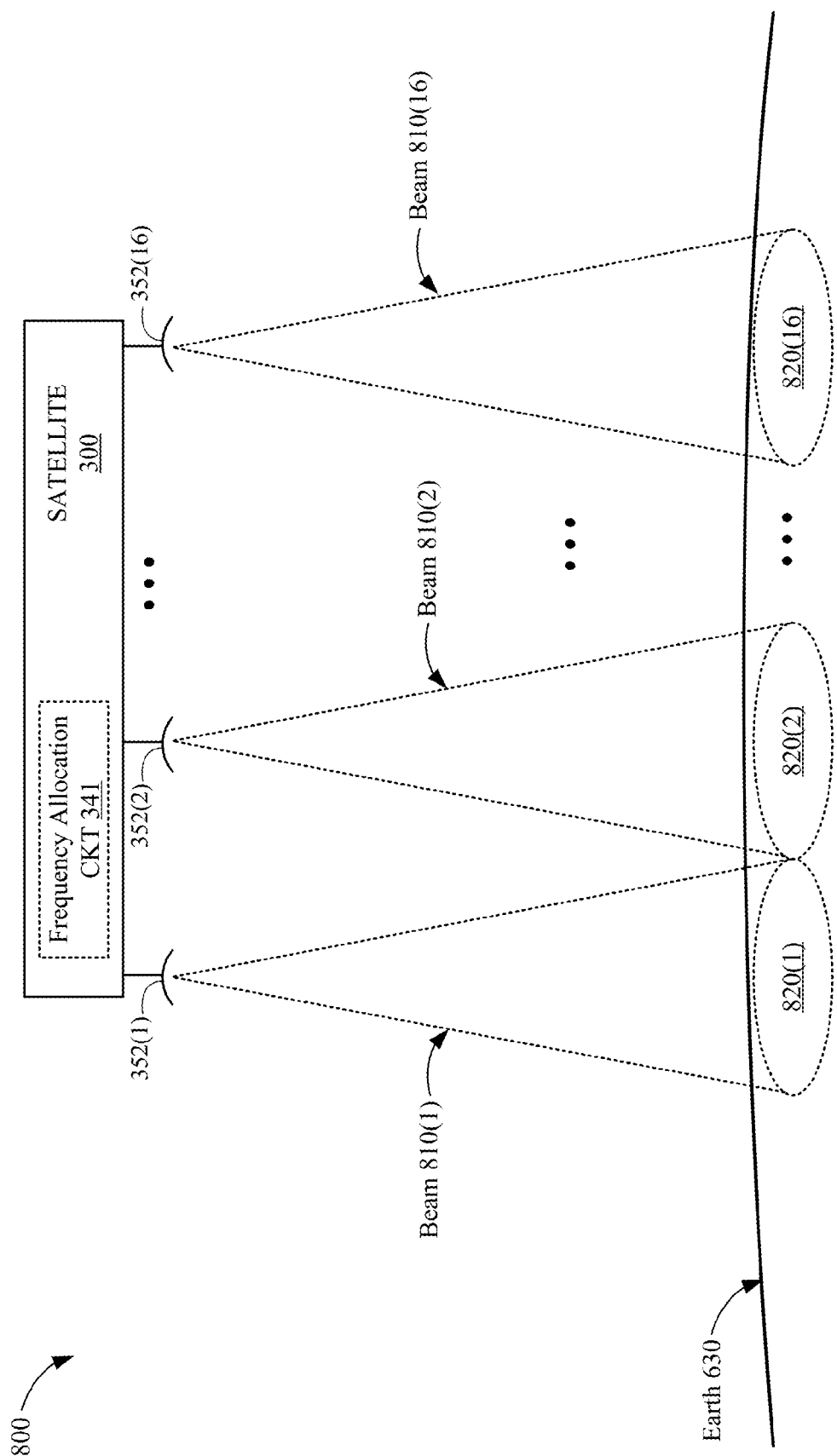
FIG. 8A depicts an NGSO satellite transmitted a number of beams onto the surface of the Earth.

FIG. 8A shows a diagram 800 depicting satellite 300 transmitting sixteen (16) beams 810(1)-810(16) from sixteen (16) antennas 352(1)-352(16), respectively. For other implementations, satellite 300 may include any suitable number of antennas 352 and/or may transmit any suitable number of beams 810. Referring also to FIG. 3, each of the antennas 352(1)-352(16) may be coupled to a corresponding forward path (FP) in the forward transponder 310 of satellite 300. Each of the beams 810(1)-810(16) may be used to transmit data from satellite 300 to one or more user terminals (e.g., UT 400 of FIG. 4) that are located within the beam's coverage area on Earth. Thus, in some aspects, the beams 810(1)-810(16) may represent the forward service link 302F between satellite 300 and a number of UTs 400. For the example diagram 800 of FIG. 8A, the beams 810(1)-810(16) are depicted as having coverage areas 820(1)-820(16), respectively, on Earth 630. Together, the coverage areas 820(1)-820(16) provided by respective beams 810(1)-810(16) may define the footprint of satellite 300.

Figure 8B:
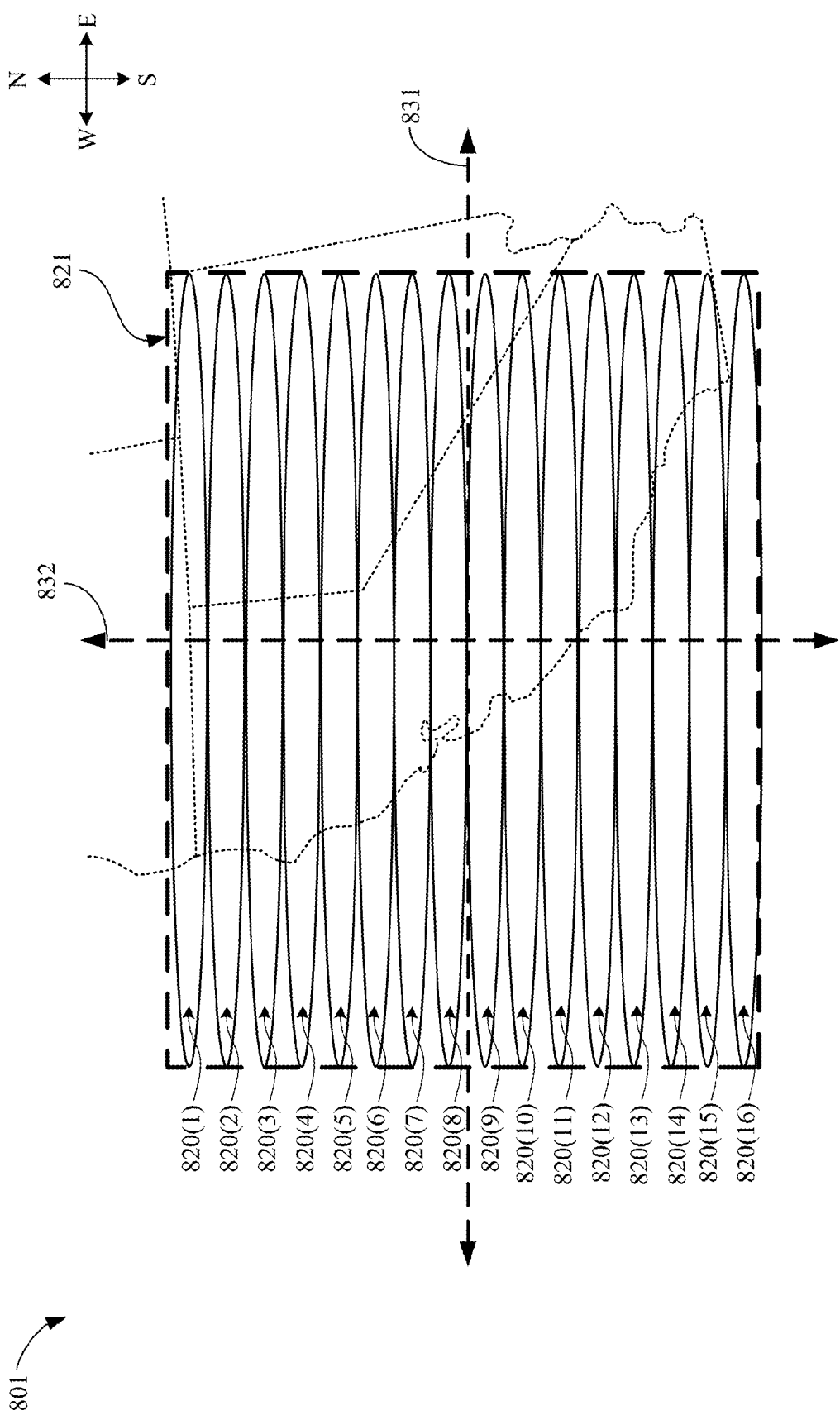
FIG. 8B depicts an example footprint of the NGSO satellite shown in FIG. 8A.

For example, FIG. 8B shows a diagram 801 depicting an example footprint 821 of satellite 300. The footprint 821 is shown to include the example coverage areas 820(1)-820(16) provided by respective beams 810(1)-810(16) transmitted from satellite 300, as depicted in FIG. 8A. In some aspects, the beams 810(1)-810(16) may be arranged in 16 rows (e.g., with one beam per row) oriented in the east-west direction, for example, so that the coverage areas 820(1)-820(16) are also oriented in the east-west direction. More specifically, as depicted in the example diagram 801 of FIG. 8B, each of the coverage areas 820(1)-820(16) may be of an oblong elliptical shape oriented in the east-west direction. In other words, for the example of FIG. 8B, the oblong elliptical shapes of the coverage areas 820(1)-820(16) may have a major axis substantially parallel to the Earth's latitudinal lines (e.g., along the direction of line 831) and a minor axis substantially parallel to the Earth's longitudinal lines (e.g., along the direction of line 832). Each of the coverage areas 820(1)-820(16) may extend across an entire width of footprint 821. For other implementations, the coverage areas 820(1)-820(16) may be of other suitable shapes, sizes, and/or orientations.

In some aspects, adjacent pairs of the coverage areas 820(1)-820(16) may touch or even overlap each other, for example, so that the footprint 821 provided by the beams 810(1)-810(16) may have minimal coverage gaps. Further, for at least some implementations, all satellites 300 in the NGSO satellite constellation 610 may have substantially similar footprints (e.g., such as footprint 821).

In some aspects, the footprint 821 may be symmetrical relative to its north-south mid-point line 831, thereby resulting in 8 unique beam patterns corresponding to coverage areas 820(1)-820(16). For example, each beam 810 that provides a coverage area 820 in the northern portion of the footprint 821 may be paired with a corresponding beam 810 that provides a coverage area 820 in the southern portion of the footprint 821, for example, so that corresponding pairs of beams 810 are substantially similar in shape but differ in azimuth angle. More specifically, beam 810(1) and beam 810(16) may be paired with each other, and may be substantially similar to each other except that beam 810(16) has a 180° shift in azimuth angle relative to beam 810(1). Similarly, beam 810(2) and beam 810(15) may be paired with each other, and may be substantially similar to each other except that beam 810(15) has a 180° shift in azimuth angle relative to beam 810(2), beam 810(3) and beam 810(14) may be paired with each other, and may be substantially similar to each other except that beam 810(14) has a 180° shift in azimuth angle relative to beam 810(3), and so on.

Figure 8C:
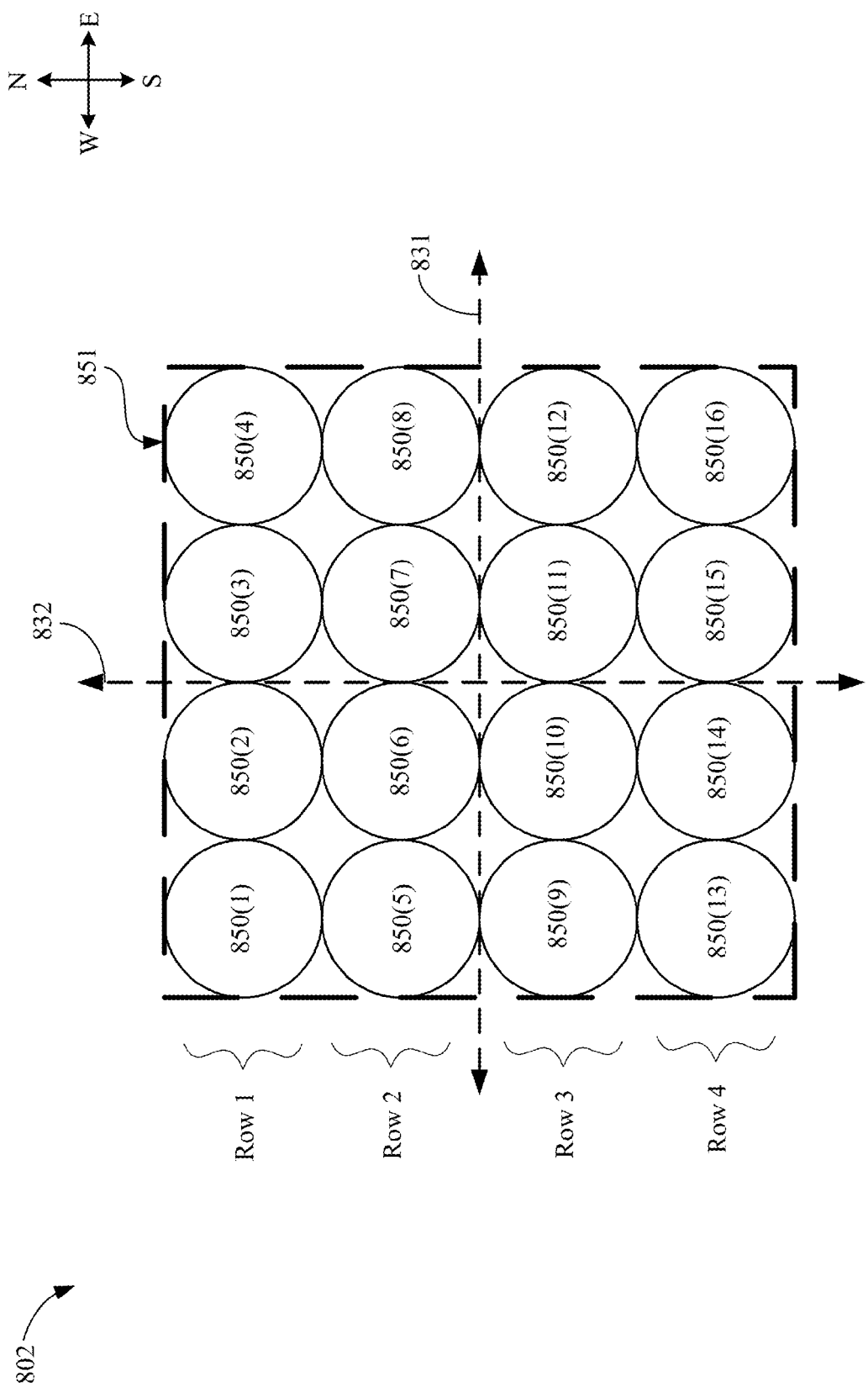
FIG. 8C depicts an example footprint formed as a 4×4 matrix of beam coverage area.

Orientation of the coverage areas 820(1)-820(16) in the east-west direction may allow satellite 300 to provide better service coverage when complying with EPFD limits, for example, compared to coverage areas or patterns that are not oriented in the east-west direction. For example, FIG. 8C shows a diagram 802 depicting another example footprint 851 that may be associated with a satellite such as satellite 300. The example footprint 851 of FIG. 8C includes a plurality of coverage areas 850(1)-850(16) arranged in a 4×4 matrix. As depicted in FIG. 8C, each row of footprint 851 is oriented in the east-west direction (e.g., along line 831), and includes four circular coverage areas 850 provided by a corresponding four beams transmitted from a given satellite (for simplicity, beams associated with coverage areas 850 (1)-850(16) are not shown in FIG. 8C). For example, a row 1 of footprint 851 includes four coverage areas 850(1)-850 (4), row 2 of footprint 851 includes four coverage areas 850(5)-850(8), row 3 of footprint 851 includes four coverage areas 850(9)-850(12), and row 4 of footprint 851 includes four coverage areas 850(13)-850(16).

As mentioned above, because GSO satellites are positioned along the GSO arc 640, exclusion zones such as exclusion zone 710 of FIG. 7B) are typically oriented in the east-west direction. As a result, if a particular row of footprint 851 touches or overlaps an exclusion zone, then all four beams that provide coverage areas 850 for the particular row are to be disabled. For example, if one of the coverage areas 850(1)-850(4) in row 1 of footprint 851 touches an exclusion zone, then it is likely that all four coverage areas 850(1)-850(4) in row 1 of footprint 851 touch the exclusion zone (e.g., due to the typical east-west orientation of the exclusion zones). Thus, to comply with EPFD limits, all four beams associated with providing coverage areas 850(1)-850 (4) may be disabled, which in turn may reduce the service area provided by footprint 851 by 25% (e.g., because one of four rows is disabled). In contrast, if the first row (e.g., coverage area 820(1)) of footprint 821 of FIG. 8B touches the exclusion zone, only one beam (e.g., beam 810(1)) may be disabled, which in turn may reduce the service area provided by footprint 821 by 1/16=6.25%.

Referring again to FIGS. 8A-8B, each of the beams 810(1)-810(16) transmitted from satellite 300 may be allocated or associated with a corresponding frequency band or channel from a set of available frequency bands or channels. As used herein, a frequency band may refer to a range of frequencies associated with a given communications channel, and thus the terms "frequency band" and "channel" may be used interchangeably herein. The beams 810(1)-810(16) may be allocated frequency bands by the frequency allocation circuit 341. The beam frequency allocation circuit 303 may also assign an antenna polarization for each of the beams 810(1)-810(16). In some aspects, the satellite 300 may use a first set of frequencies within the Ku band for the forward service link, and may use a second set of frequencies within the Ku band for the reverse service link. The first set of frequencies may be different than the second set of frequencies.

Further, for at least some implementations, each of the beams 810(1)-810(16) may have a 250 MHz channel bandwidth, some adjacent pairs of beams 810(1)-810(16) may have similar polarizations, and other adjacent pairs of beams 810(1)-810(16) may have opposite polarizations. For example, one example allocation of frequencies and polarizations to beams 810(1)-810(16) to be transmitted from satellite 300 is summarized in the Table 803 shown in FIG. 8D, where "right" refers to right-hand circular polarization (RHCP) and "left" refers to left-hand circular polarization (LHCP). For other implementations, the beams 810(1)-810 (16) may be allocated different frequency bands, may have different polarizations, and/or may have different channel bandwidths than the examples depicted in FIG. 8D. For other implementations, beams 810(1)-810(16) may have other suitable bandwidths and/or other suitable polarizations.

When satellite 300 is to disable one of its beams 810(1)-810(16), for example, to comply with the EPFD limits, the frequency allocation circuit 341 may re-map the frequency band initially allocated to the disabled beam to one or more other beams that are not to be disabled. In this manner, the one or more other non-disabled beams may use the frequency band initially allocated to the disabled beam, which in turn may increase the throughput associated with the one or more other non-disabled beams to which the frequency band are allocated.

For one example, if the coverage area 820(1) provided by beam 810(1) falls within an exclusion zone such as exclusion zone 710 of FIG. 7B (or otherwise results in violation of the ITU's EPFD limits), then the satellite 300 may disable beam 810(1) to avoid violating the EPFD limits. Once beam 810(1) is disabled, the satellite 300 may re-map the frequency band initially allocated for beam 810(1) to another beam, for example, such as beam 810(3). Referring also to FIG. 8D, beam 810(1) is initially allocated to a first frequency band between 10.70 GHz and 10.95 GHz, and beam 810(3) is initially allocated to a third frequency band between 11.20 GHz and 11.45 GHz. Thus, for this example, the frequency allocation circuit 341 may re-map the first frequency band to the non-disabled beam 810(3) so that both the first frequency band (between 10.70 GHz and 10.95 GHz) and the third frequency band (between 11.20 GHz and 11.45 GHz) are allocated to beam 810(3). Note that the first and third frequency bands occupy non-adjacent frequencies in the Ku band.

Thereafter, the non-disabled beam 810(3) may be configured to transmit first data on the first frequency band and to transmit second data on the third frequency band, concurrently. The first data may be different than the second data. Thus, after the re-allocation of the first frequency band to the non-disabled beam 810(3), the non-disabled beam 810(3) may have an effective channel bandwidth of 500 MHz—which is twice the bandwidth initially allocated to beam 810(3). Accordingly, although beam 810(1) is disabled and may result in a temporary service gap corresponding to coverage area 820(1) of footprint 821, the throughput provided by the non-disabled beam 810(3) may be increased, for example, to provide higher downlink data rates to UTs 400 within the coverage area 820(3) provided by the non-disabled beam 810(3).

For example implementations described herein, satellite 300 may be configured for wide-band operations on the order of, for example, 2 GHz. More specifically, referring also to FIG. 3, the antennas 352(1)-352(16) may be configured to operate over a 2 GHz frequency spectrum ranging from approximately 10.7 GHz to approximately 12.7 GHz, for example, so that each of the antennas 352(1)-352(16) may transmit signals on any of frequency bands or channels associated with the forward service link. In a similar manner, the filters 311 and 315, the LNAs 312 and 314, and the PAs 316 may also be configured to operate over the 2 GHz frequency spectrum ranging from approximately 10.7 GHz to approximately 12.7 GHz, for example, so that any one of the forward paths FP(1)-FP(N) of the forward transponder 310 may transmit signals on any of frequency bands or channels associated with the forward service link.

Figure 9:
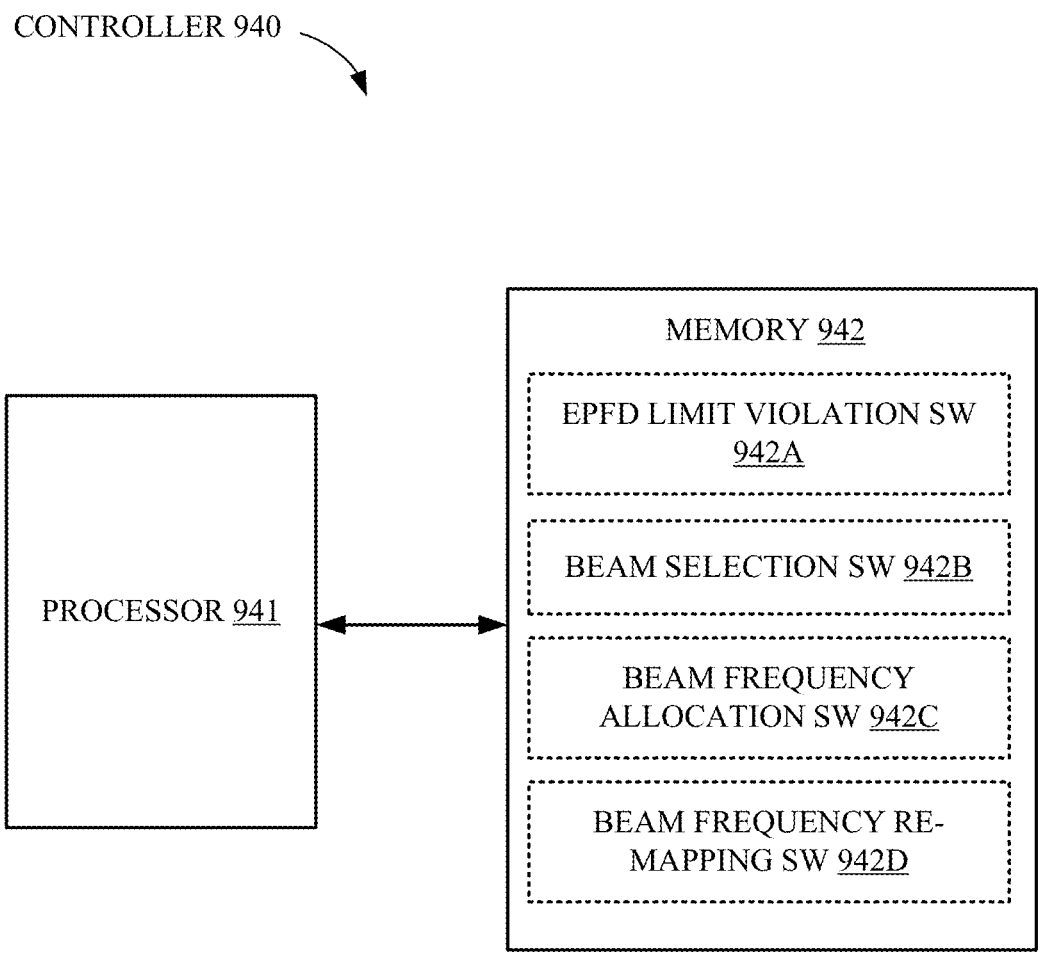
FIG. 9 shows a block diagram of an example controller in accordance with example implementations.

FIG. 9 is a block diagram of an example controller 940 in accordance with example implementations. For purposes of discussion herein, the controller 940 may be an example of (or implemented within) the gateway controller 250 of FIG. 2 and/or the satellite controller 340 of FIG. 3. For some implementations, the controller 940 may perform the functions of the frequency allocation circuit 341. Alternatively or as an addition, the controller 940 may be implemented within or coupled to the NCC and/or the SCC described above with respect to FIG. 2.

Figure 10:
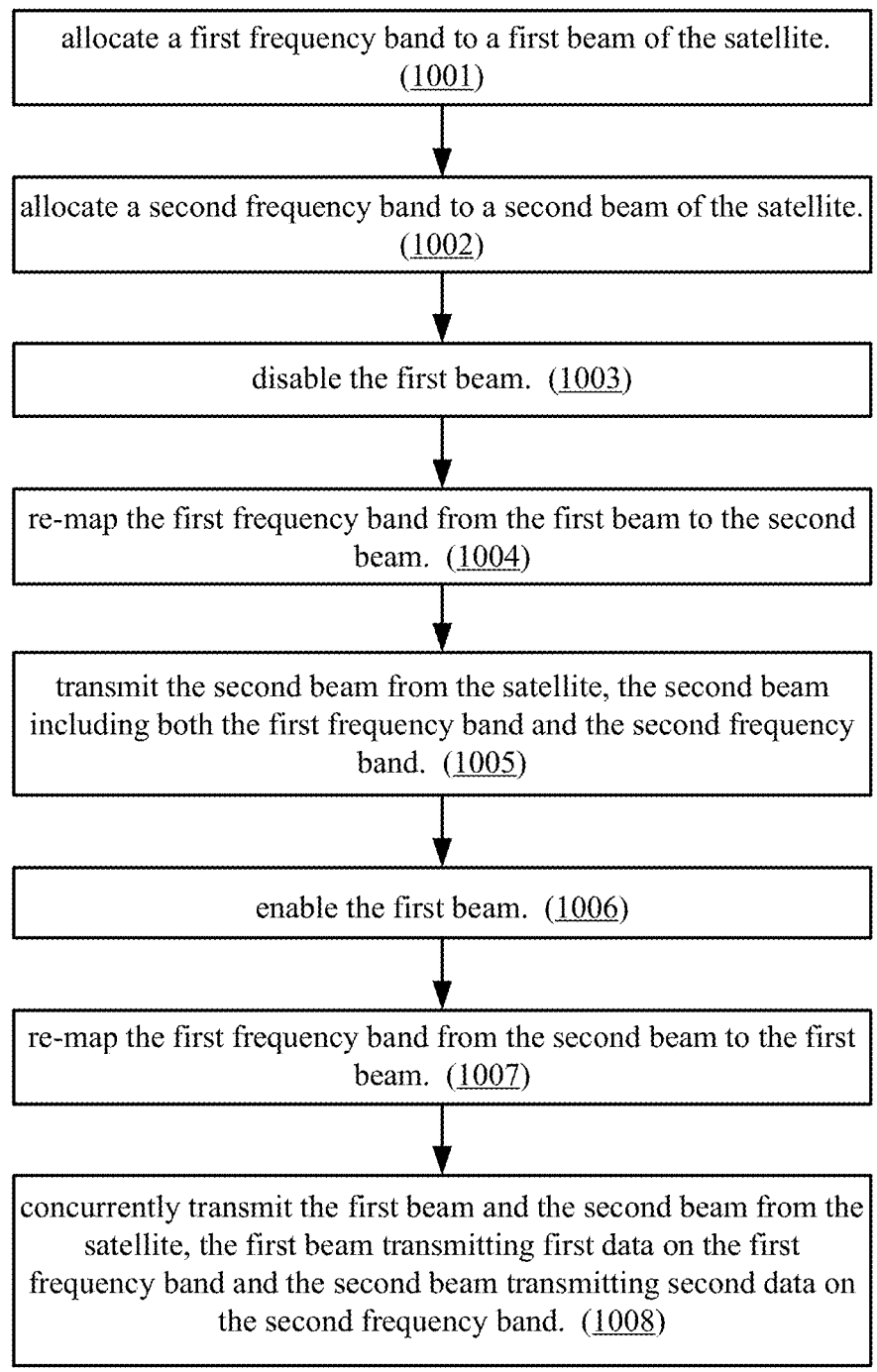
FIG. 10 shows an illustrative flowchart depicting an example operation for selectively disabling a beam of an NGSO satellite.

The controller 940 includes at least a processor 941 and a memory 942. The memory 942 may include a non-transitory computer-readable storage medium (e.g., one or more nonvolatile memory elements, such as EPROM, EEPROM, Flash memory, a hard drive, and so on) that may store the following software modules (SW):

- an EPFD limit violation module 942A to predict, detect, or otherwise determine when one or more beams transmitted from satellite 300 violate (or are to violate) the EPFD limits, for example, as described for one or more operations of FIG. 10;
- a beam selection module 942B to selectively enable and/or disable one or more beams of satellite 300 based, at least in part, on predicted or detected EPFD violations (e.g., provided by the EPFD limit violation module 942A), for example, as described for one or more operations of FIG. 10;
- a beam frequency allocation module 942C to allocate frequency bands to beams to be transmitted from satellite 300, for example, as described for one or more operations of FIG. 10; and
- a beam frequency re-mapping module 942D to dynamically re-map a frequency band from a first beam to a second beam and/or to re-map the frequency band from the second beam back to the first beam, for example, as described for one or more operations of FIG. 10.

Each software module includes instructions that, when executed by processor 941, cause controller 940 to perform the corresponding functions. The non-transitory computer-readable medium of memory 942 thus includes instructions for performing all or a portion of the operations of FIG. 10.

Figure 8E:
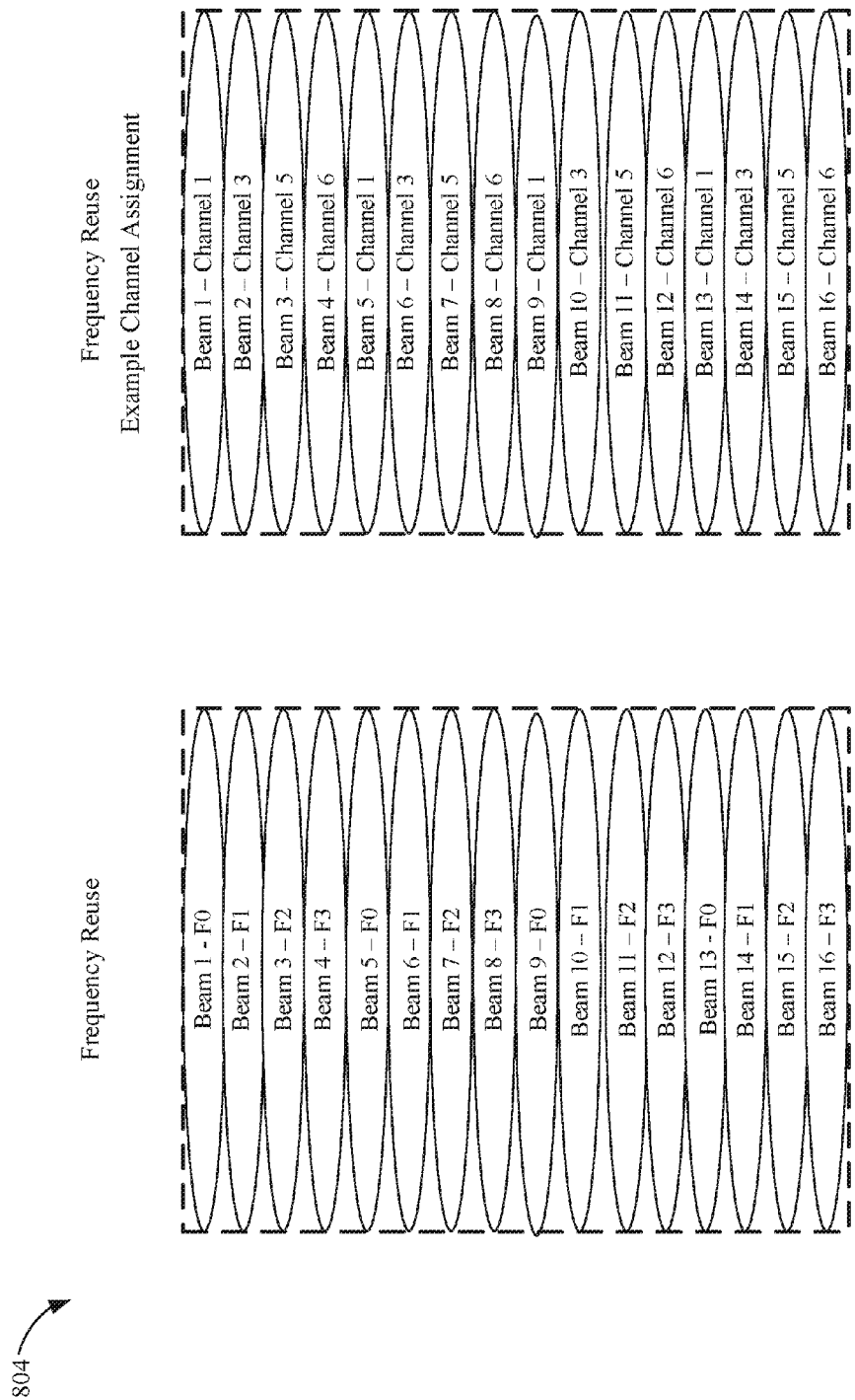
FIG. 8E depicts an example frequency re-mapping of the satellite beams depicted in FIGS. 8A-8B.

Processor 941 may be any suitable one or more processors capable of executing scripts or instructions of one or more software programs stored in controller 940 (e.g., within memory 942). For example, processor 941 may execute the EPFD limit violation module 942A to predict, detect, or otherwise determine when one or more beams transmitted from satellite 300 violate (or are to violate) the EPFD limits, for example, by determining whether one or more of beam coverage areas 820(1)-820(16) touch or overlap an exclusion zone such as exclusion zone 710 of FIG. 7B. Processor 941 may execute the beam selection module 942B to selectively enable and/or disable one or more beams of satellite 300 based, at least in part, on predicted and/or detected EPFD violations (e.g., provided by the EPFD limit violation module 942A). Processor 941 may execute the beam frequency allocation module 942C to allocate frequency bands to beams to be transmitted from satellite 300, for example, as described above with respect to FIG. 8D. Processor 941 may execute the beam frequency re-mapping module 942D to dynamically re-map a frequency band from a first beam to a second beam and/or to re-map the frequency band from the second beam back to the first beam, for example, as described above with respect to the example frequency re-mapping 804 of FIG. 8E.

FIG. 10 is an illustrative flow chart depicting an example operation 1000 for operating a satellite such as the satellite 300 of FIG. 3. The example operation 1000 may be performed by the controller 940 depicted in FIG. 9, for example, to selectively re-map a frequency band from a disabled beam of the satellite to an enabled beam of the satellite. However, it is to be understood that operation 1000 may be performed by other suitable controllers, by any suitable components of satellite 300, and/or by any suitable components of gateway 200. For example, in some aspects, the example operation 1000 may be performed by the frequency allocation circuit 341, which as discussed above may be implemented within satellite 300, may be implemented within or coupled to a corresponding gateway (e.g., gateway 200 of FIG. 2) and/or may be implemented within or coupled to the NCC or SCC described above with respect to FIG. 2.

First, the controller 940 may allocate a first frequency band to a first beam of the satellite 300 (1001), and may allocate a second frequency band to a second beam of the satellite (1002). The controller 940 may disable the first beam (1003). Next, the controller 940 may re-map the first frequency band from the first beam to the second beam (1004), and then transmit the second beam from the satellite, wherein the second beam including both the first frequency band and the second frequency band (1005).

Thereafter, the controller 940 may enable the first beam (1006). The controller 940 may re-map the first frequency band from the second beam to the first beam (1007), and then may concurrently transmit the first beam and the second beam from the satellite, the first beam transmitting first data on the first frequency band and the second beam transmitting second data on the second frequency band (1008).

Figure 11:
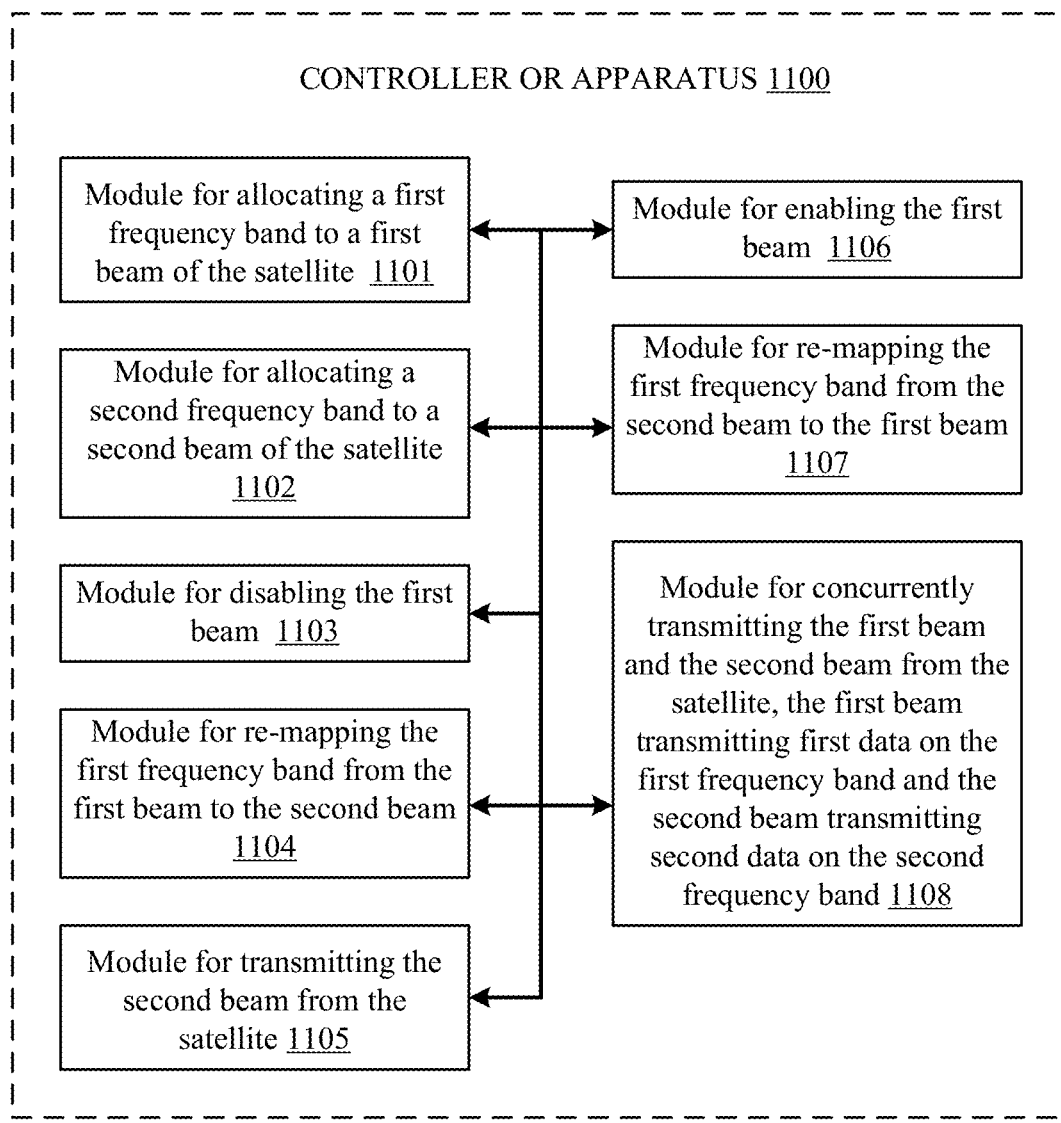
FIG. 11 is another block diagram of several sample aspects of apparatuses configured to support controlling satellite operations as taught herein.

FIG. 11 shows an example controller or apparatus 1100 represented as a series of interrelated functional modules. A module 1101 for allocating a first frequency band to a first beam of the satellite may correspond at least in some aspects to, for example, a processor as discussed herein (e.g., processor 941). A module 1102 for allocating a second frequency band to a second beam of the satellite may correspond at least in some aspects to, for example, a processor as discussed herein (e.g., processor 941). A module 1103 for disabling the first beam may correspond at least in some aspects to, for example, a processor as discussed herein (e.g., processor 941). A module 1104 for re-mapping the first frequency band from the first beam to the second beam may correspond at least in some aspects to, for example, a processor as discussed herein (e.g., processor 941). A module 1105 for transmitting the second beam from the satellite may correspond at least in some aspects to, for example, a processor as discussed herein (e.g., processor 941). A module 1106 for enabling the first beam may correspond at least in some aspects to, for example, a processor as discussed herein (e.g., processor 941). A module 1107 for re-mapping the first frequency band from the second beam to the first beam may correspond at least in some aspects to, for example, a processor as discussed herein (e.g., processor 941). A module 1108 concurrently transmitting the first beam and the second beam from the satellite, the first beam transmitting first data on the first frequency band and the second beam transmitting second data on the second frequency band may correspond at least in some aspects to, for example, a processor as discussed herein (e.g., processor 941).

The functionality of the modules of FIG. 11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 11, as well as other components and functions described herein, may be implemented using any suitable means. Such means also may be implemented, at least in part, using corresponding structure as taught herein. For example, the components described above in conjunction with the "module for" components of FIG. 11 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of operating a satellite, the method comprising:
    allocating a first frequency band to a first beam of the satellite, the first beam to provide a first coverage area on Earth extending across a footprint of the satellite;
    allocating a second frequency band to a second beam of the satellite, the second beam to provide a second coverage area on Earth extending across the footprint of the satellite;
    disabling the first beam based, at least in part, on the first coverage area provided by the first beam touching an exclusion zone associated with equivalent power flux density (EPFD) limits; and
    re-mapping the first frequency band from the first beam to the second beam.

2. The method of claim 1, further comprising:
    transmitting the second beam from the satellite, the second beam including both the first frequency band and the second frequency band.

3. The method of claim 1, the second beam transmitting first data on the first frequency band and transmitting second data on the second frequency band.

4. The method of claim 1, wherein the first frequency band and the second frequency band occupy non-adjacent ranges of frequencies in the Ku band.

5. The method of claim 1, the first coverage area and the second coverage area each extending across an entire width of the footprint of the satellite.

6. The method of claim 1, wherein the first coverage area and the second coverage area each comprise an oblong elliptical shape having a major axis oriented in an east-west direction.

7. The method of claim 1, further comprising:
    enabling the second beam to provide the second coverage area of the footprint irrespective of disabling the first beam.

8. The method of claim 1, further comprising:
    enabling the first beam;
    re-mapping the first frequency band from the second beam to the first beam; and
    concurrently transmitting the first beam and the second beam from the satellite, the first beam transmitting first data on the first frequency band and the second beam transmitting second data on the second frequency band.

9. The method of claim 1, wherein the first coverage area and the second coverage area each extends across a fraction of the width of the footprint of the satellite.

10. An apparatus for operating a satellite, the apparatus comprising:
    means for allocating a first frequency band to a first beam of the satellite, the first beam to provide a first coverage area on Earth extending across a footprint of the satellite;

means for allocating a second frequency band to a second beam of the satellite, the second beam to provide a second coverage area on Earth extending across the footprint of the satellite;

means for disabling the first beam based, at least in part, on the first coverage area provided by the first beam touching an exclusion zone associated with equivalent power flux density (EPFD) limits; and means for re-mapping the first frequency band from the first beam to the second beam.

11. The apparatus of claim 10, further comprising:
means for transmitting the second beam from the satellite, the second beam including both the first frequency band and the second frequency band.

12. The apparatus of claim 10, the second beam to transmit first data on the first frequency band and to transmit second data on the second frequency band.

13. The apparatus of claim 10, the first coverage area and the second coverage area each extending across an entire width of the footprint of the satellite.

14. The apparatus of claim 10, the first coverage area and the second coverage area each comprise an oblong elliptical shape having a major axis oriented in an east-west direction.

15. The apparatus of claim 10, further comprising:
means for enabling the second beam to provide the second coverage area of the footprint irrespective of disabling the first beam.

16. The apparatus of claim 10, further comprising:
means for enabling the first beam;
means for re-mapping the first frequency band from the second beam to the first beam; and
means for concurrently transmitting the first beam and the second beam from the satellite, the first beam transmitting first data on the first frequency band and the second beam transmitting second data on the second frequency band.

17. The apparatus of claim 10, wherein the first coverage area and the second coverage area each extends across a fraction of the width of the footprint of the satellite.

18. An apparatus for operating a satellite, the apparatus comprising:
one or more processors; and
a memory configured to store instructions that, when executed by the one or more processors, cause the apparatus to:
allocate a first frequency band to a first beam of the satellite, the first beam to provide a first coverage area on Earth extending across a footprint of the satellite;
allocate a second frequency band to a second beam of the satellite, the second beam to provide a second coverage area on Earth extending across the footprint of the satellite;
disable the first beam based, at least in part, on the first coverage area provided by the first beam touching an exclusion zone associated with equivalent power flux density (EPFD) limits; and
re-map the first frequency band from the first beam to the second beam.

19. The apparatus of claim 18, wherein execution of the instructions by the one or more processors causes the apparatus to further:
transmit the second beam from the satellite, the second beam including both the first frequency band and the second frequency band.

20. The apparatus of claim 18, the second beam to transmit first data on the first frequency band and to transmit second data on the second frequency band.

21. The apparatus of claim 18, the first coverage area and the second coverage area each extending across an entire width of the footprint of the satellite.

22. The apparatus of claim 21, the first coverage area and the second coverage area each comprise an oblong elliptical shape having a major axis oriented in an east-west direction.

23. The apparatus of claim 18, execution of the instructions by the one or more processors causes the apparatus to further:
enable the second beam to provide the second coverage area of the footprint irrespective of disabling the first beam.

24. The apparatus of claim 18, wherein execution of the instructions by the one or more processors causes the apparatus to further:
enable the first beam;
re-map the first frequency band from the second beam to the first beam; and
concurrently transmit the first beam and the second beam from the satellite, the first beam transmitting first data on the first frequency band and the second beam transmitting second data on the second frequency band.

25. The apparatus of claim 18, wherein the first coverage area and the second coverage area each extends across a fraction of the width of the footprint of the satellite.

26. A non-transitory computer-readable medium storing instructions that, when executed by one or more processors of a satellite, cause the satellite to perform operations comprising:
allocating a first frequency band to a first beam of the satellite, the first beam to provide a first coverage area on Earth extending across a footprint of the satellite;
allocating a second frequency band to a second beam of the satellite, the second beam to provide a second coverage area on Earth extending across the footprint of the satellite;
disabling the first beam based, at least in part, on the first coverage area provided by the first beam touching an exclusion zone associated with equivalent power flux density (EPFD) limits; and
re-mapping the first frequency band from the first beam to the second beam.

27. The non-transitory computer-readable medium of claim 26, wherein execution of the instructions by the one or more processors causes the satellite to perform operations further comprising:
transmitting the second beam from the satellite, the second beam including both the first frequency band and the second frequency band.

28. The non-transitory computer-readable medium of claim 26, the second beam to transmit first data on the first frequency band and to transmit second data on the second frequency band.

29. The non-transitory computer-readable medium of claim 26, wherein the first frequency band and the second frequency band occupy non-adjacent ranges of frequencies in the Ku band.

30. The non-transitory computer-readable medium of claim 26, the first coverage area and the second coverage area each extending across an entire width of the footprint of the satellite.

31. The non-transitory computer-readable medium of claim 26, the first coverage area and the second coverage area each comprise an oblong elliptical shape having a major axis oriented in an east-west direction.

32. The non-transitory computer-readable medium of claim 26, wherein execution of the instructions by the one or more processors cause the satellite to perform operations further comprising:
   enabling the second beam to provide the second coverage area of the footprint irrespective of disabling the first beam.

33. The non-transitory computer-readable medium of claim 26, wherein execution of the instructions by the one or more processors causes the satellite to perform operations further comprising:
   enabling the first beam;
   re-mapping the first frequency band from the second beam to the first beam; and
   concurrently transmitting the first beam and the second beam from the satellite, the first beam transmitting first data on the first frequency band and the second beam transmitting second data on the second frequency band.

34. The non-transitory computer-readable medium of claim 26, wherein the first coverage area and the second coverage area each extends across a fraction of the width of the footprint of the satellite.

\* \* \* \* \*